Figure 1:
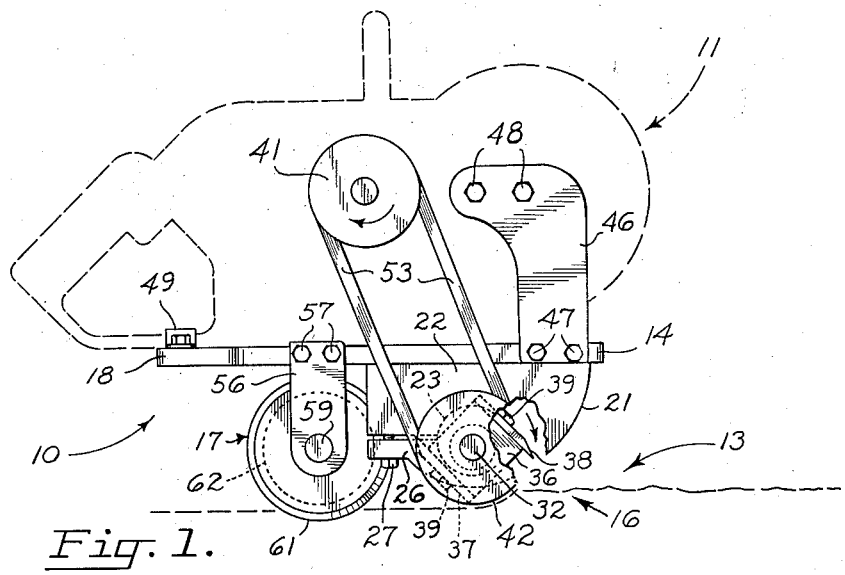

Aug. 11, 1959

E. G. AUSTIN 2,898,960

ROUTING APPARATUS

Filed Feb. 11, 1958

INVENTOR.
Eldon G. Austin
BY
Ramsey and Kolisch
Attys

United States Patent Office 2,898,960
Patented Aug. 11, 1959

2,898,960

ROUTING APPARATUS

Eldon G. Austin, Molalla, Oreg., assignor to Molalla Manufacturing Co., Molalla, Oreg., a corporation of Oregon Application February 11, 1958, Serial No. 714,647

3 Claims. (Cl. 144—208)

This invention relates to timber-routing apparatus of the portable variety, such as may be used for routing timbers and logs, and more particularly to novel support mechanism for supporting the router and motor of a motor-driven router for movement over a surface to be treated.

It is a general object of this invention to provide improved mechanism for supporting a router for travel over a surface which renders the router extremely maneuverable and easily handled, so as to enable an operator to produce easily and quickly the desired depth of cut and direction of cut. The invention has particular utility in conjunction with logs of relatively small diameter, as for example small pulp logs commonly harvested for processing into paper and cardboard pulp.

In manufacturing paper and other products from harvested timber, it is best to ross the bark from a log soon after cutting, as the bark interferes considerably with future manufacturing operations. The advantages of log debarking have been quite evident, but the practice has not been uniformly carried out, due to the expense involved in procuring and maintaining suitable equipment. Many loggers have dispensed with bark rossing as not being economically feasible.

There has been a particularly acute need for portable rossing equipment suitable for use with relatively small-diameter logs, such as are used in the manufacture of paper pulp. Ideally this sort of equipment should be relatively light so that it may be wielded easily, and may be maneuverable, durable, and of low cost.

This invention contemplates an attachment for portable motors, such as a chain-saw motor, which converts the motor into a highly efficient and practicable bark rosser. The attachment includes a frame or support platform for mounting the motor. Carried beneath the frame at the forward end thereof is a rotatable routing member. When a motor is attached to the upper side of the frame and drivingly connected to rotate this routing member, the motor, frame and routing member are entirely supported over a surface by a single, elongated roller mechanism situated in the frame rearwardly of the routing member. The elongated roller mechanism, by supporting the apparatus independently of other support mechanism, provides a pivotal support for the frame, motor and routing member about an axis extending transversely of the frame. The construction enables an operator to increase the depth of cut merely by pivoting the motor and frame forwardly on the roller mechanism. Conversely, to decrease the depth of the cut, the operator pivots the apparatus in the opposite direction.

The roller mechanism is made up of an elongated shaft extending transversely beneath the frame through the axial centers of a plurality of disk members laterally spaced along the shaft. Specifically, three disk members are employed, two laterally outer disk members having equal diameters, and an inner or center disk member having a smaller diameter than the two laterally outer ones. The disk members provide three laterally spaced points of support. When relatively large logs are being treated, and it is desired to have movement of the router substantially in a straight line longitudinally along the log, the outer disk members provide the support. With a relatively small-diameter log, only the single, central disk member engages the surface of the log. With a single-point support, the mechanism can not only be readily pivoted fore and aft to vary the depth of cut, but also may be readily swung angularly relative to the longitudinal dimension of the log, or tipped from side to side. This has been found to be particularly advantageous with small-diameter timbers.

A further more specific object of the invention, therefore, is to provide routing apparatus which is supported by a single roller mechanism situated rearwardly of a rotatable routing member mounted forwardly in the apparatus, the single roller mechanism providing pivotal support for the apparatus. The roller mechanism is rearwardly of the routing member, to permit maximum visibility of the surface treated. The routing member is mounted well forwardly in the apparatus, so that the frame of the apparatus may act as a shield and guard the operator from chips and debris thrown out by operation of the routing member.

Routing apparatus of this invention preferably includes an elongated routing member having elongated cutters extending along the length of the routing member. These have sharpened cutting edges, which bite into the material to be cleared when the member is rotated. According to this invention, the motor is connected to the routing member so as to rotate the routing member in a direction which moves the cutting edges downwardly when the cutters occupy a position forwardly of the rotational axis of the routing member. In other words, viewing the apparatus from the right-hand side, the routing member is rotated in a clockwise direction, as opposed to a counterclockwise direction. This construction stabilizes the mechanism, since the reaction force set up by a cutter encountering a relatively tough obstruction tends to throw the mechanism backwardly on its roller support. Thus a single transverse roller support may be used quite effectively which is stable under most all operating conditions.

Another feature and characteristic of the invention is the inclusion of mechanism for varying the vertical and longitudinal position of the routing member relative to the frame of the apparatus. This is important as it accommodates adjustment of the tension of the power-transmitting means used for transmitting drive from the motor to the routing member. Further, vertical adjustment enables adjustment of the angle the apparatus occupies to produce a given depth of cut. Longitudinal adjustment also is important in balancing the mechanism. It is contemplated that according to a preferred embodiment, the frame, motor and routing member will be supported by the roller support so that when the apparatus is in an operating position, the roller support is substantially in line with the center of gravity for the apparatus.

Figure 2:
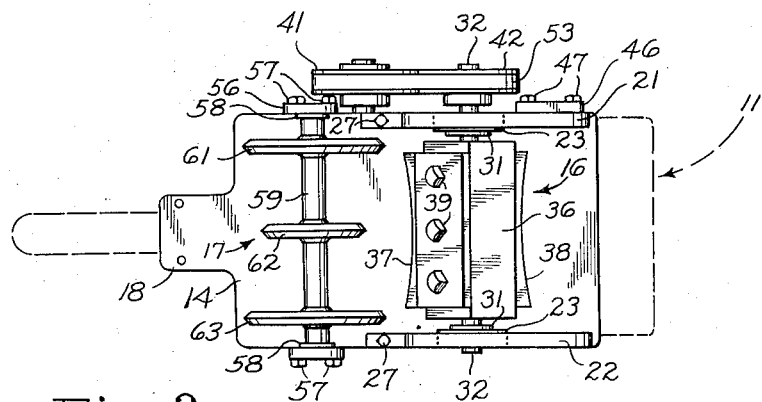

These and other novel features, objects and advantages are attained by the present invention, which is described hereinbelow in conjunction with the accompanying drawings wherein:

Fig. 1 is a side view of apparatus according to an embodiment of this invention; and Fig. 2 is a bottom view of the apparatus illustrated in Fig. 1.

Referring now to the drawings for a description of a specific embodiment of this invention, 10 indicates generally a portable attachment mechanism carrying a portable, chain-saw motor indicated in dashed outline at 11. The apparatus is shown in the position it normally occupies during a pass over a log, indicated in outline at 13. The attachment mechanism 10 includes a support or base frame 14, an elongated routing member 16 at the forward end thereof, and a roller-support means 17 mounted beneath the frame 14 rearwardly of the routing member.

The support frame 14 is preferably comprised of a solid plate of suitable rigidity to provide a solid support for a motor mounted thereon. By using a plate, as compared to a lattice-type structure or open-frame-type structure, a shield is provided which deflects chips and debris from traveling into the eyes of an operator. It will be noted that the routing member 16 is mounted well forwardly in the attachment mechanism. In the embodiment illustrated, with reference to Fig. 2, the frame 14 has generally a rectangular outline, save for a protrusion 18 at the rear end thereof for attaching the handle of a chain-saw motor thereto.

Depending downwardly from the forward end of the frame 14 are a pair of mounting portions 21 and 22. Each of these mounting portions carries an eccentric member 23 rotatably positionable therein. As shown, each eccentric is mounted in an arm portion 26 integral at one end with the body of its mounting portion but split away at the other end to enable movement of this end toward and away from the body of its mounting portion. The free ends of the arms 26 are tightened about the eccentric members by a pair of bolts 27. To adjust the position of an eccentric member, one of the bolts 27 is loosened and the eccentric rotated so that it revolves about its axial center, which is the adjustment axis for the eccentric.

The routing member 16 will now be described. Rotatably mounted in each eccentric as by a bearing 31 is a shaft 32. The shaft rotates about an axis offset laterally from the common mounting axis of the eccentric members. From the above it will be seen that rotation of the eccentric members on each side of the frame serves to move the shaft 32 vertically and longitudinally relative to the frame 14.

The shaft 32 has affixed thereto a rectangular core portion 36. Affixed to the periphery of the core portions 36 are a pair of cutting elements or blades 37 and 38. These are tightened onto the core as by bolts 39. Each of the blades is sharpened along its leading edge, as can be seen in Fig. 1, with the blade beveled inwardly from the outer face of the blade. The blade may have a straight edge, or a curved edge as shown in Fig. 2. In the usual instance, with a bark rosser, the edges of the blades will have a radius of curvature somewhat in excess of the radius of curvature of the usual logs being debarked.

The routing member 16 is rotated about its longitudinal center, i.e., the axial center of the shaft 32, by means of the chain-saw motor 11. Conventionally, a chain-saw motor includes a driving member, illustrated herein by a pulley 41. Actuation of the motor rotates the pulley 41 in the direction of the arrow shown in Fig. 1, i.e., in a clockwise direction as viewed in the figure.

An outer end of the shaft 32 has affixed thereto a driven pulley 42. The pulleys 41 and 42 are drivingly connected by a power-transmitting means, or belt 53. Preferably a belt having a positive grip is employed such as a Gemmer timing belt, sold by the U.S. Rubber Company. A flat rubber belt or a chain drive can also be employed. Actuation of the chain-saw motor rotates the routing member in a clockwise direction as viewed in Fig. 1, i.e., so as to rotate the routing member so that the cutting edges of the member occupy a position forwardly of the rotational axis for the member when they move downwardly against a surface.

The chain-saw motor 11 is affixed to the frame 14 by a bracket 46. The bracket is affixed to the frame as by bolts 47, and to the housing for the motor by a set of bolts 48. The usual chain-saw motor is provided along its side with a planar surface which mounts the saw blade for the chain saw. When attaching a chain-saw motor to the frame 14 of this invention, the chain-saw blade is removed and the bracket 46 is fastened to this planar portion. The bracket 46 is conformed so that when the bracket is affixed to the frame 14 and to the chain-saw motor, the driving member 41 of the chain-saw motor is aligned with the driven member 42. The bracket 46 in this manner serves as an aligning means for aligning the driving member of the motor with the driven member connected to the routing member 16. Proper alignment is important in reducing wear in the belt 53. The motor is also secured to the frame 14 by a clamp 49 surrounding the handle for the motor and affixed to the protrusion 18.

Rearwardly of the routing member is the roller-support means 17. The support means is mounted beneath the frame by a set of depending legs 56. These legs are secured to the frame as by bolts 57. The lower end of each leg has a bearing 58 rotatably mounting one end of a roller shaft 59.

Affixed to the roller shaft as by welding, and laterally spaced therealong, are three disk members indicated at 61, 62, and 63. The laterally outer disk members 61, 63 have equal diameters, each of which is larger than the diameter of the center disk member 62. In routing large logs, the outer disk members 61, 63 engage the log, and the inner disk member 62 normally is carried clear of the log. Since two disk members engage the log, the routing apparatus in this instance tends to travel along more or less of a straight line. With smaller logs, support for the apparatus is provided solely by the center disk member 62. In this instance the support provided not only allows pivotal movement of the apparatus about a transverse axis, but also allows free swinging and/or tipping of the apparatus. This is important in the treatment of small logs, as it enables the machine to be moved readily to compensate for the contour of the log.

The shaft 59 of the roller mechanism is located substantially in line with the center of gravity for the apparatus when the motor is attached to the upper side of the support frame 14. In this way it is a relatively simple matter to pivot the apparatus either forwardly or rearwardly to control the depth of a cut. The eccentric members may be adjusted to produce proper balance in the apparatus.

It is a feature of this invention that the roller-support means is carried rearwardly of the routing member. The routing member tends to deflect chips against the under side of the support 14, support 14 acting as a shield. Further, the mechanism is manipulated readily from the rear end of the mechanism, which contributes to better visibility for an operator using the apparatus. The rear location of the roller support is also important in conjunction with the direction of rotation of the routing member described. When the cutters of the routing member engage bark or other material, and the material is tougher than usual, the reaction force set up is exerted downwardly on the roller-support means. This has a stabilizing action which is important where a pivotal support is used as contemplated by this invention.

The apparatus of this invention is easily and conveniently used in rossing bark off a log right up to the extreme end of the log, as no forward support is utilized. Further, with relatively small logs, the apparatus may be swung from right to left or tilted to take care of the relatively sharp curvature of the outer periphery of the log. Since the attachment mechanism may be used with conventional chain-saw motors, the cost of the apparatus is low.

While there has been described a single embodiment of this invention, it is appreciated that changes in the arrangement and parts may be made without departing from the inventive scope thereof. It is intended not to be limited to the specific embodiment shown, and it is desired to cover all modifications and variations which would be apparent to one skilled in the art that come within the scope of the appended claims.

It is claimed and desired to secure by Letters Patent:

1. Timber-routing apparatus comprising a frame adapted to mount a portable motor, an elongated routing member rotatably mounted beneath said frame and transversely thereof for rotation about its longitudinal axis, and means for supporting said frame and routing member for travel over a surface to be treated, said last-mentioned means comprising an elongated shaft mounted beneath the underside of said frame rearwardly of said routing member and extending transversely of said frame and generally parallel to the longitudinal axis of said routing member, and a center and two laterally outer disk members mounted on said shaft, said two laterally outer disk members having equal diameters each of which exceeds the diameter of said center disk member, said disk members supporting said frame and routing member independently of other support mechanism, thereby to position said frame above a surface for free pivotal movement thereof about a transverse axis.

2. A timber router comprising a frame, a motor having a rotating driving member, said motor being mounted on the upper side of said frame, an elongated routing member rotatably mounted beneath said frame and transversely thereof for rotation about its longitudinal axis, said routing member having elongated cutters extending along the length thereof with sharpened cutting edges along the length of the cutters, power-transmitting means drivingly connecting said driving member and routing member, and means for supporting said frame and routing member for travel over a surface to be treated, said last-mentioned means comprising a roller means rotatable about an axis extending transversely of said frame and rotatably mounted beneath said frame rearwardly of said routing member, said roller means supporting said frame and routing member independently of other support mechanism, thereby to position said frame above a surface for free pivotal movement thereof about a transverse axis, said roller means being positioned under said frame and motor approximately in line with the center of gravity for said frame and motor when these are supported in an operating position.

3. A timber router comprising a frame, a motor having a rotating driving member, said motor being mounted on the upper side of said frame, an elongated routing member rotatably mounted beneath said frame and transversely thereof for rotation about its longitudinal axis, said routing member having elongated cutters extending along the length thereof with sharpened cutting edges along the length of the cutters, power-transmitting means drivingly connecting said driving member and routing member, said motor and power-transmitting means rotating said routing member in a direction which moves said cutting edges downwardly when they occupy a position forwardly of the longitudinal axis for said routing member, and means for supporting said frame and routing member for travel over a surface to be treated, said last-mentioned means comprising an elongated shaft mounted beneath the underside of said frame rearwardly of said routing member and extending transversely of said frame and generally parallel to the longitudinal axis of said routing member, and a center and two laterally outer disk members mounted on said shaft, said two laterally outer disk members having equal diameters each of which exceeds the diameter of said center of disk member, said disk members supporting said frame and routing member independently of other support mechanism, thereby to position said frame above a surface for free pivotal movement thereof about a transverse axis.

References Cited in the file of this patent

UNITED STATES PATENTS

| 1,701,912 | De Walt | Feb. 12, 1929 |
| 1,758,029 | Cole et al. | May 13, 1930 |
| 2,707,979 | Falkman et al. | May 10, 1955 |
| 2,780,252 | Gyllenberg | Feb. 5, 1957 |
| 2,821,216 | West et al. | Jan. 28, 1958 |

FOREIGN PATENTS

| 81,963 | Norway | June 22, 1953 |
| 518,038 | Great Britain | Feb. 15, 1940 |